3,289,015
PULSE GENERATOR

Richard Anthony Fitch, Reading, and Vernon Thomas Seymour Howell, Newbury, England, assignors to United Kingdom Atomic Energy Authority, London, England Filed Oct. 1, 1964, Ser. No. 403,688
Claims priority, application Great Britain, Oct. 10, 1963, 39,995/63
11 Claims. (Cl. 307—110)

This invention relates to generators of electrical pulses and is a continuation-in-part of U.S. application Serial No. 195,050, filed May 14th, 1962, and now abandoned.

An object of the invention is to provide a pulse generator which as a single unit can store electrical charge at one voltage and discharge it as a pulse having a peak value higher than the storage voltage.

Pulse generators as designed before this invention necessarily require a plurality of units in order to achieve the production of a pulse having a peak voltage above the charging voltage. Even the simplest pulse transformer circuit requires a pulse transformer and a capacitor. The well-known Marx generator consists of a plurality of capacitors which are charged in parallel and discharged in series. Each capacitor requires a switch for its connection in series to the adjacent capacitor. Each increment, in pulse voltage, equal to the charging voltage requires another capacitor and switch.

An equally well-known type of generator, the line-type generator, in its simplest form consists of a transmission line or its network equivalent, connected to discharge into a load. When the load is matched to the transmission line there is maximum pulse voltage which can be only half the charging voltage. The voltage across the load was raised to be equal to the charging voltage in the well-known circuit named after its inventor Blumlein. In this circuit two transmission lines of equal impedance are connected to a matched load and are charged in parallel and discharged in series. Generalised circuits to enable the pulse voltage to be raised above the charging voltage have been proposed but each increment of half the charging voltage requires the addition of another transmission line.

Further discussion of pulse generators can be found, if required, in the book, "Pulse Generators," by Glasoe and Lebacqz, McGraw-Hill 1948.

To sum up, therefore, known pulse generators increase rapidly in complexity as the designed pulse voltage increases above the charging voltage. To give a simple example, a pulse voltage of ten times the charging voltage would require ten capacitors and switches in a Marx generator, and twenty transmission lines in a line-type generator.

In contrast with this, the pulse generator of the invention can generate pulses having a peak voltage up to the order of one hundred times the charging voltage, and can do this as a single unit. It should be pointed out, however, that the duration of the pulse increases as the pulse voltage becomes a higher multiple of the charging voltage, and the shape of the pulse is triangular, not square. Although the advantages of the invention rest primarily in its simplicity as a single unit, further advantages with respect to short rise times can be obtained by using a plurality of the pulse generators of this invention connected to add their output.

The invention consists in a pulse generator comprising two sheets of electrically conductive material and two sheets of electrically insulating material arranged alternately and wound together into a roll thereby forming two open-ended strip transmission lines having in common a sheet of electrically conductive material, connection means for connecting the sheets of electrically conductive material to an electrical source to charge the transmission lines, connection means for connecting a load across opposite ends of one of the conductors and connection means for connecting the two sheets of electrically conductive material through a switch to discharge not more than one of the said two transmission lines.

Although the inventors do not wish to be bound by any theory, they believe that the invention will be better understood by reference to the following discussion and drawings. The discussion is based on one particular embodiment of the invention but it is obviously capable of general application.

Figure 1:
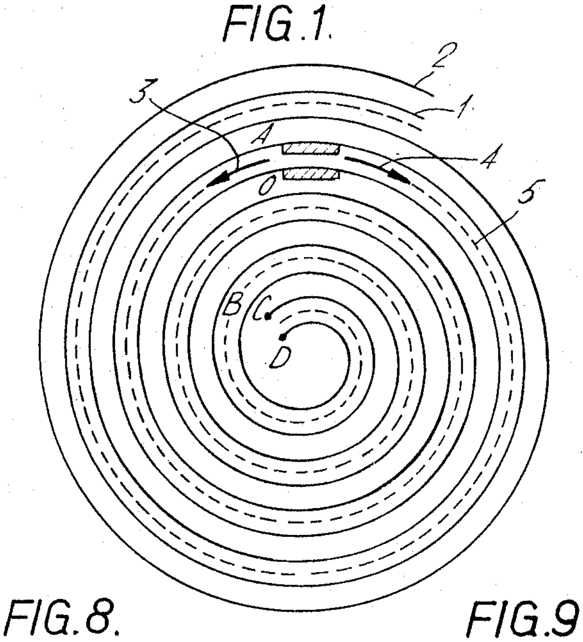
FIGURE 1 is an axial view of two transmission lines wound into a roll.

In FIGURE 1 two conductors 1 and 2 are separated by an insulator which for simplicity is not illustrated. A tab A is in contact with conductor 1 and tab O is in contact with conductor 2. The pulse generator shown in this drawing can be regarded as a rolled foil capacitor, which can be charged like any other capacitor, and this concept is valuable in helping to understand the action of the generator. The terms "pulse generator" and "capacitor" will be used hereafter to refer to the same thing, and will be used to emphasize the particular aspect.

If the pulse generator shown in this drawing is charged, and a discharge initiated by closing a switch of low inductance across tabs AO, two waves originate at the tabs and travel along the insulator in the directions shown by arrows 3 and 4. The path of waves through the insulator is indicated by the dotted line 5. Following the waves we find that only half the capacitor is discharged during the time taken for the waves to travel through the insulator to the inner and outer ends of the roll. Stating this in other words it can be said that of the two transmission lines formed by the conductors the electrostatic field in only one has been cancelled and replaced by an electromagnetic field. An interesting point arises with respect to the inner ends of the transmission lines. The line terminating at BC in FIGURE 1 is connected to the line terminating at CD by loop BD. This will affect the reflection of the wave at the inner end of the transmission line.

As the waves travel along the transmission line they convert the electrostatic field into an electromagnetic field, and when they retrace their path after reflection at the ends of the transmission line they convert the electromagnetic field back to an electrostatic field whose vector is reversed with respect to the vector of the original electrostatic field. Since the transmission lines are capacitatively coupled the wave in one line affects the potential of the other line.

Figure 3:
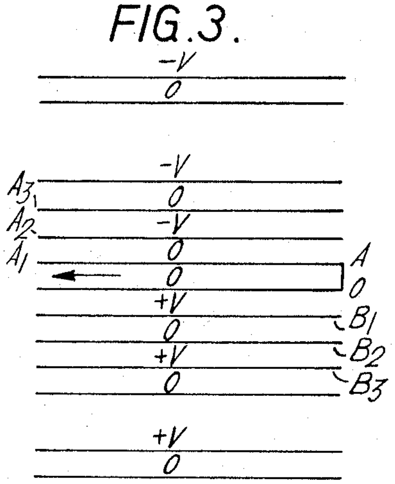
Figure 4:
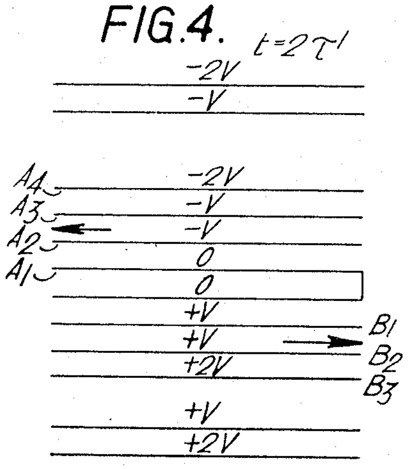
Figure 5:
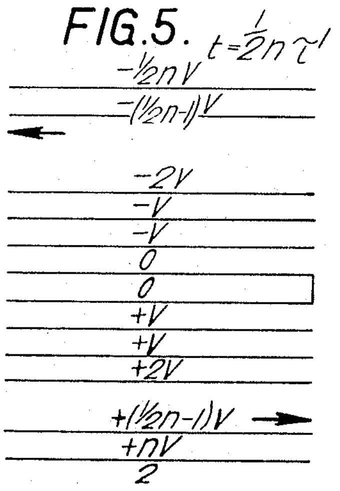
Figure 6:
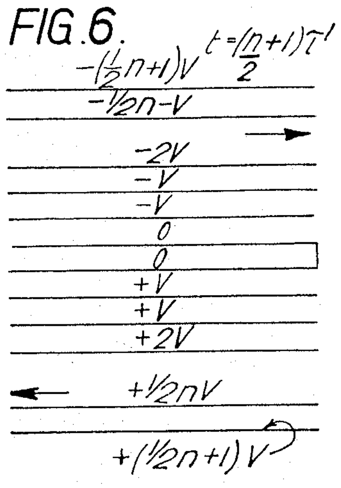
Figure 7:
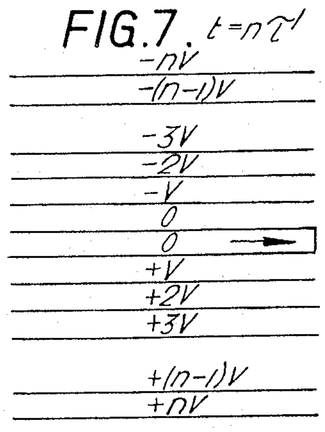

The diagrams in FIGURES 2 to 7 show, for successive intervals of time, the state of an idealised section of that part of the capacitor lying to the left of the radius through AO in FIGURE 1. The initial wave travels from right to left below the switch and left to right above at successive intervals of time $\tau'$ (the time for the wave to travel one turn). We define the potential of the point O as zero for all time; the potential of the rest of the conductors connected to O is initially zero and that of the conductor connected to A is +V. The switch is assumed perfect and the system lossless, then in $O<t<\tau'$ the potential of conductor $A_1$ falls to zero, but as no energy can be extracted from the rest of the system the potential differences between all other conductors remain as before—except that the potential of each conductor above O has gone down by V, as shown in FIGURE 3. In $$t<\tau<2t$$

the potential differences between $A_2A_3$ and between $B_1B_2$ collapse; as before, the rest of the system is unaffected except that each conductor outside $A_3$ and $B_2$ changes in potential as shown in FIGURE 4. Carrying this process through we see (FIGURE 5) that when the waves arrive at the boundaries the potential across the upper half is $-\frac{1}{2}n$V and across the lower half $+\frac{1}{2}n$V so that a total voltage $n$V exists between the extremities, where $n$ is the number of turns.

The two ends of the line are, to a first approximation, unterminated and the waves are therefore reflected unchanged. Applying the same reasoning as above we obtain the state shown in FIGURE 6 and finally (FIGURE 7) we see that the total voltage across the extremities is $2n$V. Arriving back at the switch the waves are reflected inverted and proceed to reduce the total voltage until at the second arrival at the switch the cycle is complete, the condenser is in its pristine state and the voltage across the ends is zero. This process—on the idealised model—is repeated indefinitely and the passive line remains undischarged. In any practical system the process degenerates and eventually both lines are completely discharged; however, the theory indicates how very large voltages can be generated in such a capacitor.

Figure 8:
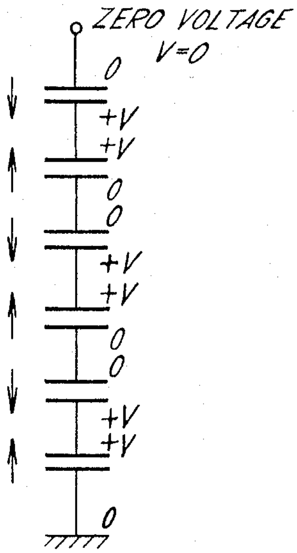
FIGURES 8 and 9 are diagrams illustrating a layered system of electrostatic fields and the reversal of fields in one direction.
Figure 9:
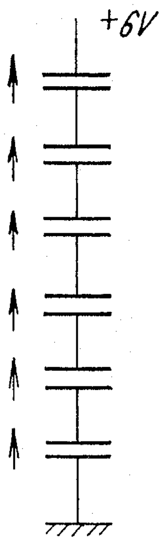
Figure 2:
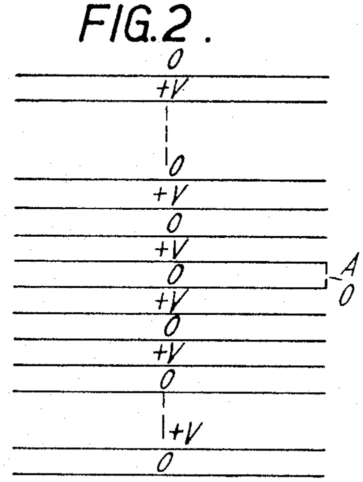
FIGURES 2 to 7 are diagrammatic side elevations of a thin segment taken in a radial direction through the roll, the figures indicating the electrical states at successive times.

There are several ways of looking at the process; for example, by considering the time-variation of the total magnetic field and applying Maxwell's equations one obtains a similar picture of the voltage build-up. A possibly simpler picture of the generator is obtained by regarding it as a travelling-wave-switched series capacitor generator: the capacitor units initially connected in series opposition are converted to series coincidence by the wave. This is illustrated in FIGURES 8 and 9. What in effect happens is that the electrostatic energy of the situation in FIGURE 8 is first converted to magnetic energy in the wave outward journey, leaving the stacked potentials of the passive line unopposed; then the magnetic energy is converted back, by the reflected wave, to electrostatic energy of opposite sign which adds on to that of the passive line as in FIGURE 9.

Having given a summary of the mode of operation of the invention, we shall now give a summary of the theory.

In the ideal case the theory is simple: making the further assumption that the thickness of the winding is small compared to the diameter (so that the length per turn is constant) the voltage builds up in a series of equal steps of amplitude 2V and duration $\tau'$ giving a triangular wave approximately described by the following equations:

$$O<t<\tau$$

$$V^*(t)=\frac{V}{\tau'}t$$

Where $t$=time, $V^*$=maximum output voltage, V is voltage to which capacitor is charged initially=rise time of output pulse $\therefore V^*=2nV$ where $n$=number of turns in capacitor (2)

$$\tau<t<2\tau \quad V^*(t)=2V\left(n-\frac{t-\tau}{\tau'}\right)$$

(3)

$$\tau=\frac{n\pi Dk}{C}$$

where D=internal diameter of winding (4)

$k$=dielectric constant and $c$=velocity of light.

$$C^*=\left(\frac{1}{2n}\right)^2\cdot C$$

where $C^*$=output capacitance and $C$=conventional capacitance. (5)

In practice the following effects reduce the voltage magnification (i) Resistive loss in the conductors.

(ii) Coupling between the ends of the active and passive lines.

(iii) Degenerative discharge of the concentric capacitor layers through the parallel inductances of the windings.

(iv) Switch imperfections.

The resistive loss is large because (a) it is typically $10^{-8}$ to $10^{-7}$ secs. so that the skin depth is $\sim 10^{-3}$ cm., and (b) the characteristic impedance of the line is small—typically $\sim$0.3 ohm. Thus the attenuation exp.

$$(-Rl_w/2Z)$$

where R is resistance per unit length of line, $l_w$ is length of winding, and Z is impedance of line becomes large for modest values of $l_w$. This sets a limit to the number of turns for a given core diameter and hence to the voltage magnification.

The active line terminating at CD is actually connected to the passive line BC via one turn as shown in FIGURE 1. Thus the approximation of zero coupling is only valid for a time small compared with $L_T/Z$ where $L_T$=inductance per turn; substituting for $L_T$ and Z we obtain an expression for the minimum core diameter:

$D=9.6\ nl_x$ where $l_x$ is insulation thickness (6)

But large D makes $l_w$ large and conflicts with the requirement for low resistive attenuation, so it is necessary to seek a compromise. Some alleviation should result from tapering the ends of the lines, by inserting a ferromagnetic core to increase the inductance or by separating the ends of the foils by 180°.

The wavefront should ideally have a rise-time small compared with $\tau$. This is difficult to achieve mainly because of the $dI/dt$ limitation of the switch. The line impedance is low so the switch inductance must not exceed a few $m\mu H$, this can be achieved with very high-pressure gas, liquid or solid dielectric switches, but $dI/dt$ for a generator of $\sim 10^3$ joule is $\sim 10^{14}$ amp./sec. which requires parallel switches. The value of $dI/dt$ required to make this effect negligible is given by the following:

$$\dot{I}=\frac{E_{sx}^2}{7}\cdot\frac{\beta^2}{k}\cdot\frac{V}{V^{*2}}\cdot C^*$$

where $E_{sx}$=electric strength of insulator;

$\dot{I}$=rate of rise of current in switch, $$\beta=\frac{V^*}{2nV}$$

The combined effect of these limitations is to reduce the output voltage by the factor.

$V^*=2n\beta V$

Empirically $0.3<\beta<0.6$

The rise time of the high voltage pulse is given by $$\tau\simeq 0.3k^{1/2}\cdot\frac{1}{\beta^2 E_{sx}}\cdot\frac{V^{*2}}{V}$$

which, for example, is $\sim 10^{-7}$ secs. for $V^*\sim 10^6$, $V\sim 5\times 10^4$. This is long for some applications.

Figure 10:
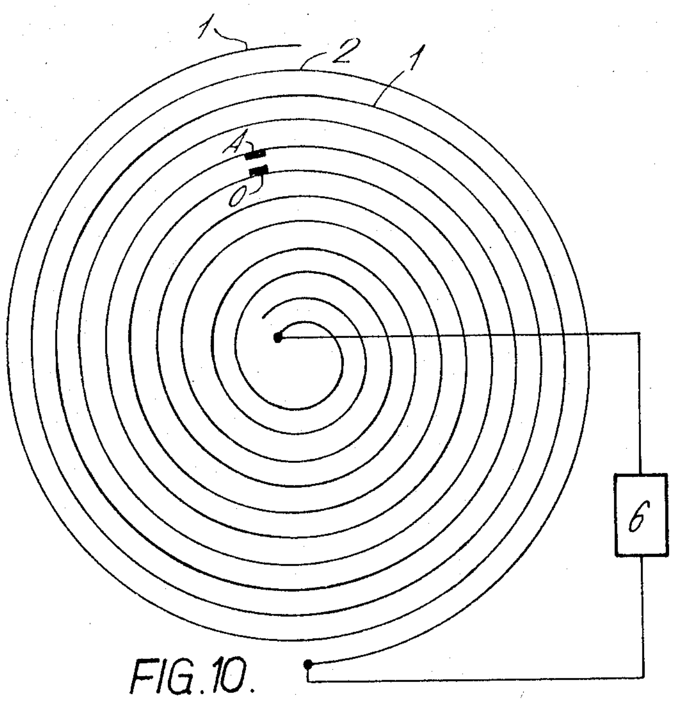
FIGURE 10 illustrates an embodiment of the invention.

In FIGURE 10 opposite ends of conductor 2 are connected to a load 6. When a low impedance switch is closed across tabs AO after charging, a high voltage pulse will be impressed on the load 6.

In an experiment on an embodiment of the invention a rolled foil capacitor potted in an epoxy resin was used. Its characteristics were $C=0.5\mu F$
$V=7$kv.
$n=60$
$l_1$=width of foil=3¼ inches.

The conductors were 0.001 inch aluminium foil and the insulator was 0.004 inch film of polyethylene tetraphthalate.

$V^*=300$ kv.
and $\tau=130\times10^{-9}$ secs.

The pulse generated in the above-described manner has a relatively slow rise-time, being substantially triangular in shape. In some applications a pulse having a faster rise-time may be needed, which may be required to feed into a resistive load.

At the peak of the triangular waveform, the above-described generator can be regarded as a short length of charged coaxial line equal in length to the width of the sheets. This characteristic can be utilized to produce a pulse having a relatively fast rise-time, by taking the output connections from the same side of opposite ends of conductor 2, and connecting a further switch in series with the output connections to discharge the generator into the load at the instant of peak voltage of the triangular waveform. The duration of the pulse delivered to the load is determined by the width of the sheets, i.e., by the length of the short coaxial line which they form.

Generally, in such applications, it is desirable that the output impedance of the generator should match that of the load. The output impedance of such a "coaxial-line" generator is resistive and is, to a good approximation, inversely proportional to its diameter, assuming the radial thickness of the assembly of rolled sheets and interleaved insulation to be small relative to the diameter, as is normally the case. Thus in such a generator the empty space inside the former on which the sheets are rolled usually accounts for the bulk of the total volume. Some reduction in external dimensions can be achieved by using a ferromagnetic core, but this is costly and introduces additional insulation problems. An alternative arrangement giving a reduced total volume will now be described with reference to FIGURES 11–14.

The design of a pulse generator of the kind already described, for discharging as a short length of coaxial transmission-line through a further switch into a matching load, is determined by the following equations:

$$V=2nBE_{sx}l_z$$
$$T=2l_{\perp}k^{1/2}c^{-1}$$
$$Z=240n\ l_x(K^{1/2}D)^{-1}$$

where $V$=Peak output voltage
$T$=Duration of output pulse
$Z$=Output impedance of the short coaxial transmission line formed between the innermost and outermost turns.
$n$=Number of turns in the roll.
$B$=Total loss factor.
$E_{sx}$=Electric field through the insulation between adjacent conducting sheets.
$l_x$=Thickness of insulation between adjacent conducting sheets.
$l_{\perp}$=Width of conducting sheets.
$k$=Dielectric constant.
$c$=Velocity of light.
$D$=Diameter of the generator.

Figure 11:
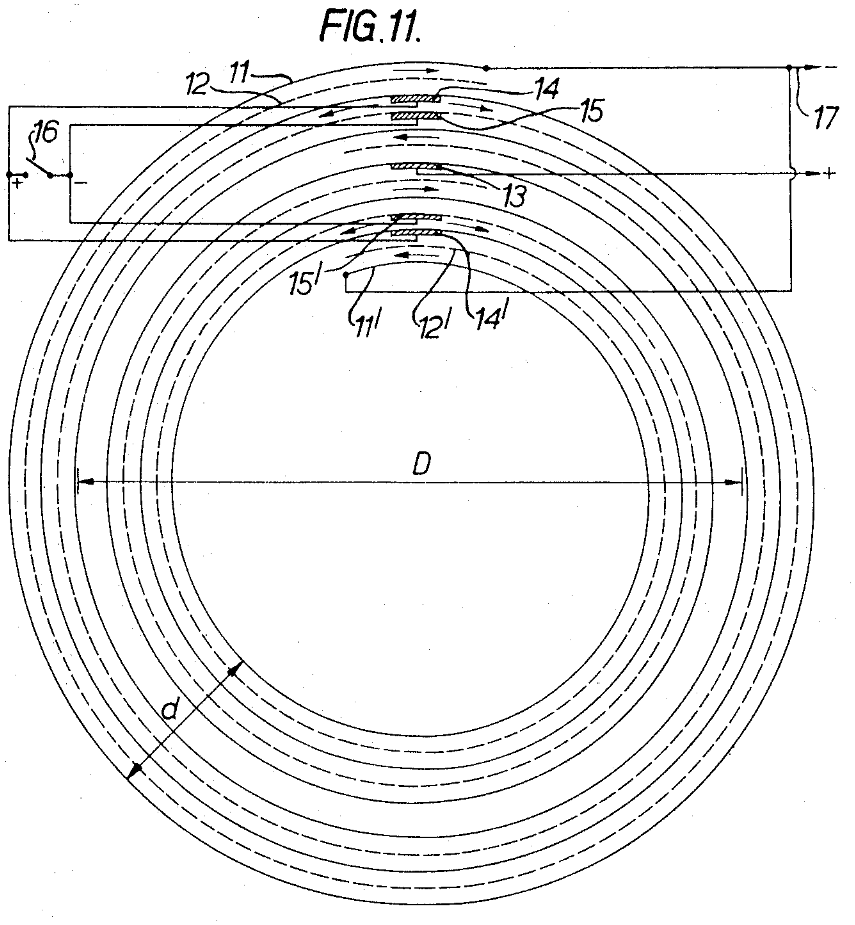
FIGURE 11 is a diagrammatic axial view of another generator embodying the invention.

These equations assume, as does the following description, that D is large compared with the radial thickness of the assembly of rolled sheets, shown as $d$ in FIGURE 11. It may be noted that provided this condition is satisfied, it is unimportant whether D is measured as the mean diameter as shown, or as the internal or external diameter. It will be seen that Z is, to a good approximation, inversely proportional to D.

Referring now to FIGURE 11, the latter shows, in effect, two generators of the kind already described located concentrically one within the other. The outer of these two generators comprises a pair of conducting sheets 11 and 12 and the inner a similar pair of sheets 11' and 12', separated by sheets of an insulating dielectric which is omitted for clarity. Sheets 11 and 11' in fact form one continuous sheet whose mid-point is connected to a tab 13, whereas sheets 12 and 12' are non-continuous adjacent the tab 13. The mid-points of sheets 11 and 12 are connected to tabs 14 and 15, respectively, and the mid-point of sheets 11' and 12' to tabs 14' and 15', respectively. Tabs 14 and 14' are connected to one side of a switch 16 (normally a spark-gap), and tabs 15 and 15' to the other side.

In operation sheets 11 and 11' are charged with a given polarity (say +ve) relative to sheets 12 and 12'. When the switch 16 closes, one of each pair of the strip transmission lines formed between the sheets is discharged by the waves indicated by the horizontal arrows, in the manner already described in detail. As a result, the outer end of sheet 11 and the inner end of sheet 11' simultaneously go negative relative to tab 13 for the duration of a triangular pulse, i.e., the pulses generated between the ends of sheets 11 and 11', respectively, are of opposite radial polarity. These latter ends are connected together to form one side of the output, as shown at 17, the other side of the output being taken from tab 13 where sheets 11 and 11' are joined by virtue of being one continuous sheet.

Figure 12:
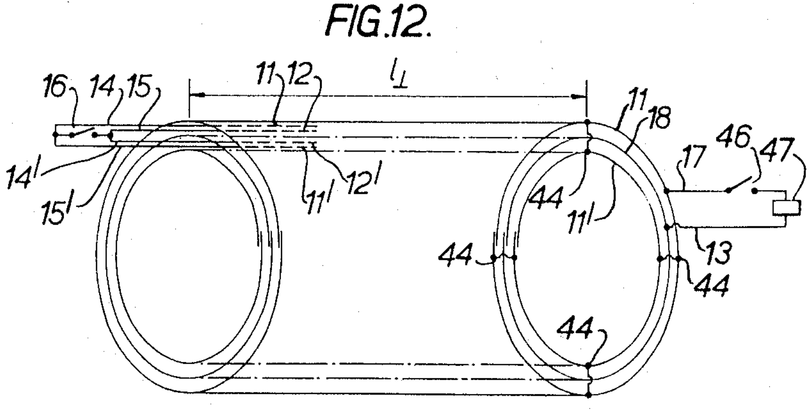
FIGURE 12 is a diagrammatic elevation of the generator of FIGURE 11.

In FIGURE 12 it will be seen that at the instant of peak voltage, the generator forms two short charged coaxial transmission lines of length $l_{\perp}$, one line being formed between the outer turn of sheet 11 and the turn, designated 18, common to sheets 11 and 11', and the other between the inner turn of sheet 11' and turn 18. These two lines are connected in parallel at the output side of the generator by means of four paralleling connections 44 between sheets 11 and 11' shown symbolically. A high-speed switch 46 (normally a spark-gap) is connected between the output connections 13, 17 and the load 47, and is arranged to close at the peak voltage of the generator, thereby delivering an output pulse of duration T.

Connected in parallel as shown in FIGURE 12, the individual impedances of the two short charged coaxial lines must clearly be doubled, as compared with the single charged coaxial line formed by a single generator, to match a load of given impedance. Hence D is reduced, in theory by 50% but in practice by about 30%, as compared with the dimensions of a single generator. V and T remain unchanged.

Figure 13:
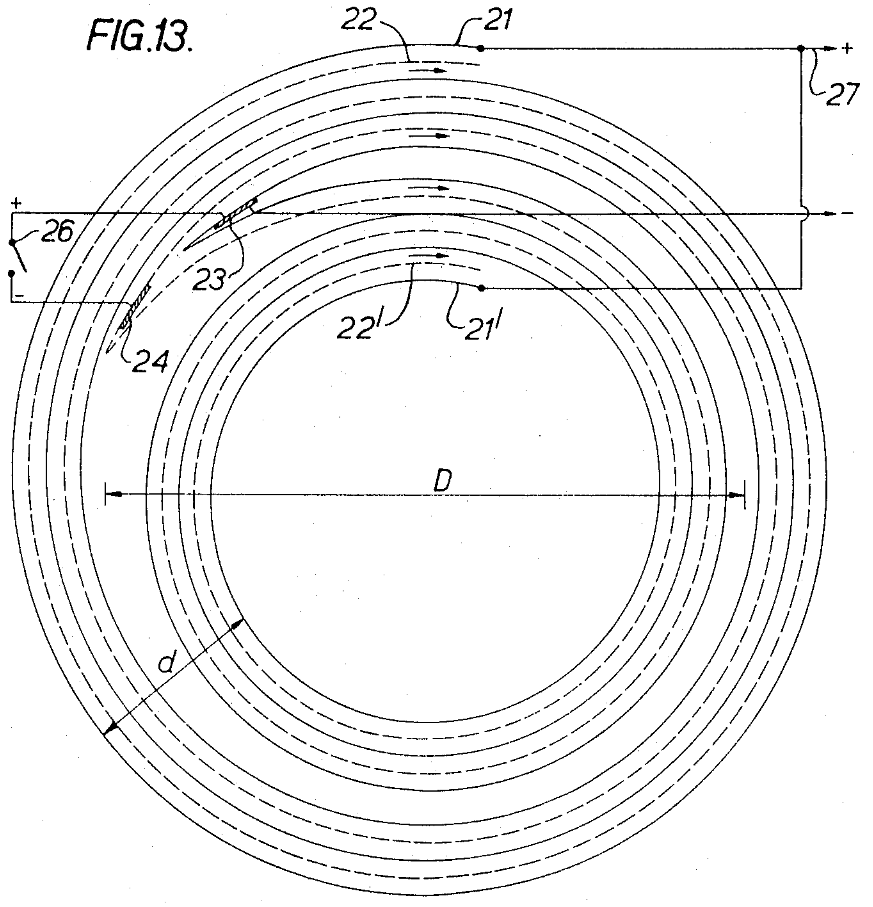
FIGURE 13 is a diagrammatic axial view of a yet further generator embodying the invention.
Figure 14:
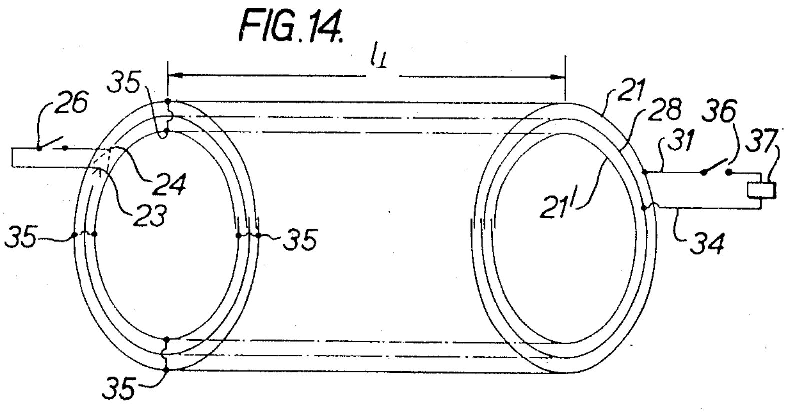
FIGURE 14 is a diagrammatic elevation of the generator of FIGURE 13.

In FIGURE 13 the twin generators formed by sheets 21, 22 and 21', 22' respectively are wound in opposite directions, the inner ends of sheets 21 and 22 being continuous with the outer ends of sheets 21' and 22', respectively. Switch 26 is connected to these interconnected ends via tabs 23, 24 as shown, so that the single strip transmission line discharged in each generator is not discharged from its mid-point, as in FIGURE 11, but from one end. This system of discharging the individual generators is more lossy than mid-point discharging, so that the peak voltage is reduced, whilst the duration of the triangular pulse is doubled. However it facilitates series connection of the two charged lines so formed, as shown in FIGURE 14. Similarly, although it is not essential to wind the twin generators in opposite directions, this arrangement simplifies the connections to the switch 26.

With sheets 21 and 21' charged +vely relative to sheets 22 and 22', closure of switch 26 results in the outer end of sheet 21 and the inner end of sheet 21' becoming +ve relative to tab 23, so that these ends can be connected to one side of the output as shown at 27.

Referring to FIGURE 14, the two output connections are taken from the outer turn of sheet 21 via tab 31 and from its inner turn (designated 28, which is also the outer turn of sheet 21') via tab 34. The tab connections 35 between the outer turn of sheet 21 and the inner turn of sheet 21' are shown symbolically at the opposite side of the generator. Thus on closure, at peak voltage, of a switch 36 connecting tabs 31, 34 to a load 37, the two short charged coaxial lines formed between the inner and outer turns of sheets 21 and 21', respectively, and turn 28 discharge in series into the load. Output tab 31 could alternatively be connected to the inner turn of sheet 21'.

Connected in series as shown in FIGURE 14, the individual impedances of the two short charged lines remain the same as for a single generator to match a load of given impedance. For an output pulse of given duration T, the value of $l_{\perp}$ is halved, but the total axial length is reduced by less than half because the total end-margin length (i.e., the insulation extending beyond the side edges of the sheets) is doubled. D is slightly increased.

We claim:

1. A pulse generator comprising two sheets of electrically conductive material and two sheets of electrically insulating material arranged alternately and wound together into a roll thereby forming two open-ended strip transmission lines having in common a sheet of electrically conductive material, connection means for connecting the sheets of electrically conductive material to an electrical source to charge the transmission lines, connection means for connecting a load across opposite ends of one of the conductors, switch means, and connection means located at substantially the mid-point of the transmission line for connecting the two sheets of electrically conductive material together through said switch means to discharge not more than one of the said two transmission lines.

2. A pulse generator as claimed in claim 1 in which one of the sheets of electrically conductive material is longer than the other sheet of electrically conductive material and extends round the roll by one half of a turn to separate the ends of the said sheets by substantially 180°.

3. A pulse generator as claimed in claim 1 in which the width of the sheets of conductive material decreases towards one or both of the ends, the decrease being substantially smooth to avoid unwanted reflections in the transmission lines.

4. A pulse generator as claimed in claim 1 in which the roll has a core of highly inductive material.

5. A pulse generator as claimed in claim 1 in which the said sheets are thin foils.

6. A pulse generator comprising two sheets of electrically conductive material and two sheets of electrically insulating material arranged alternately and wound together into a roll thereby forming two open-ended strip transmission lines having in common a sheet of electrically conductive material, connection means for connecting the sheets of electrically conductive material to an electrical source to charge the transmission lines, a load, connection means for connecting said load across opposite ends of one of the conductors, switch means, and connection means for connecting the two sheets of electrically conductive material together through said switch means to discharge not more than one of the said two transmission lines.

7. A pulse generator as claimed in claim 6 wherein the connection means for connecting said load across opposite ends of one of the conductors are taken from the same side of said conductor, and wherein further switch means is connected in series with said connection means to discharge the generator into the load at the instant of peak voltage.

8. A pulse generator comprising two pulse generators as claimed in claim 6 arranged concentrically one within the other and including switch means adapted to generate simultaneous voltage pulses of opposite radial polarity in the two generators, and connections for connecting the outputs of the two generators to discharge into a common load.

9. An electrical pulse generator comprising two pairs of mutually insulated electrically conducting sheets, each pair being rolled together to form two pairs of strip transmission lines and one of said pairs of lines being located concentrically within the other pair, switch means connected to discharge one only of each pair of strip transmission lines and generate voltage pulses of opposite radial polarity between the ends of a given sheet of each pair, a first connection between the outer end of the inner given sheet and the inner end of the outer given sheet, and a second connection between the inner end of the inner given sheet and the outer end of the outer given sheet.

10. A generator as claimed in claim 9 comprising output connections taken from the same side of the given sheets as said second connection whereby the two coaxial lines formed by the generator are effectively connected in parallel with said output connections.

11. A generator as claimed in claim 9 comprising output connections taken from the opposite side of the given sheets from the said second connection whereby the two coaxial lines formed by the generator are effectively connected in series with said output connections.

No references cited.

BERNARD KONICK, *Primary Examiner.*

G. LIEBERSTEIN, *Assistant Examiner.*